United States Patent [19]
Kajimoto et al.

[11] Patent Number: 5,838,394
[45] Date of Patent: *Nov. 17, 1998

[54] PICTURE STORAGE DEVICE SEPARATES LUMINANCE SIGNAL INTO EVEN NUMBER AND ODD NUMBER DATA AND SEPARATES TWO CHANNEL COLOR SIGNAL INTO FORMER HALF PIXELS AND LATTER HALF PIXELS

[75] Inventors: Masato Kajimoto, Chiba; Hirofumi Murase, Kanagawa, both of Japan

[73] Assignee: Sony Corporation, Tokyo, Japan

[ * ] Notice: The term of this patent shall not extend beyond the expiration date of Pat. No. 5,654,773.

[21] Appl. No.: 828,390

[22] Filed: Mar. 28, 1997

Related U.S. Application Data

[62] Division of Ser. No. 568,646, Dec. 7, 1995, Pat. No. 5,654,773.

[30] Foreign Application Priority Data

Dec. 13, 1994 [JP] Japan ................................ 6-308945

[51] Int. Cl.$^6$ ............................................ H04N 9/64
[52] U.S. Cl. .................... 348/717; 348/450; 348/489; 348/391; 348/715
[58] Field of Search ................... 348/392, 393, 348/391, 450, 514, 523, 715, 717, 718, 489, 491, 231; 345/153, 154, 186, 200; H04N 9/64, 11/02

[56] References Cited

U.S. PATENT DOCUMENTS

| | | | |
|---|---|---|---|
| 5,043,799 | 8/1991 | Kohiyama et al. | 348/715 |
| 5,155,584 | 10/1992 | Taguchi et al. | 348/491 |
| 5,348,581 | 1/1995 | Ikeda | 348/717 |
| 5,469,228 | 11/1995 | Kim et al. | 348/715 |
| 5,486,929 | 1/1996 | Heyl | 348/392 |
| 5,654,773 | 8/1997 | Kajimoto et al. | 348/717 |

*Primary Examiner*—Sherrie Hsia
*Attorney, Agent, or Firm*—Jay H. Maioli

[57] ABSTRACT

A picture storage device conveniently employed in conjunction with an electronic still camera or a video camera has an input data converting unit for separating luminance signals of input color picture data having a non-interlaced data format with the sampling rate of the luminance signals and two-route color signals of 4:2:0 into a data string of even-numbered pixels and a data string of odd-numbered pixels, separating the two-route color signals of the color picture data into a data string of the former half pixels and a data string of the latter half pixels, and distributing and re-arraying the separated data, a storage unit having a storage capacity of at least one frame and adapted for storing data in a data re-arraying sequence by the input converting unit, a display data converting unit for converting the data stored in the storage unit into picture-displaying data, and a controller for controlling the input converting unit into synchronization with data writing in the storage unit.

1 Claim, 10 Drawing Sheets

FIG.1

VRAM01

| Y0.0 | Y1.0 | Y2.0 | | Y318.0 | Y319.0 |
|---|---|---|---|---|---|
| Y0.1 | Y1.1 | Y2.1 | | Y318.1 | Y319.1 |
| Y0.2 | Y1.2 | Y2.2 | | Y318.2 | Y319.2 |
| | | | | | |
| Y0.478 | Y1.478 | Y2.478 | | Y318.478 | Y319.478 |
| Y0.479 | Y1.479 | Y2.479 | | Y318.479 | Y319.479 |

VRAM02

| | Y320.0 | Y321.0 | Y322.0 | | Y638.0 | Y639.0 |
|---|---|---|---|---|---|---|
| | Y320.1 | Y321.1 | Y322.1 | | Y638.1 | Y639.1 |
| | Y320.2 | Y321.2 | Y322.2 | | Y638.2 | Y639.2 |
| | | | | | | |
| | Y320.478 | Y321.478 | Y322.478 | | Y638.478 | Y639.478 |
| | Y320.479 | Y321.479 | Y322.479 | | Y638.479 | Y639.479 |

VRAM03

| C0.0 | C1.0 | Y2.0 | | C318.0 | C319.0 |
|---|---|---|---|---|---|
| C0.1 | C1.1 | Y2.1 | | C318.1 | C319.1 |
| C0.2 | C1.2 | Y2.2 | | C318.2 | C319.2 |
| | | | | | |
| C0.478 | C1.478 | Y2.478 | | C318.478 | C319.478 |
| C0.479 | C1.479 | Y2.479 | | C318.479 | C319.479 |

VRAM04

| | C320.0 | C321.0 | C322.0 | | C638.0 | C639.0 |
|---|---|---|---|---|---|---|
| | C320.1 | C321.1 | C322.1 | | C638.1 | C639.1 |
| | C320.2 | C321.2 | C322.2 | | C638.2 | C639.2 |
| | | | | | | |
| | C320.478 | C321.478 | C322.478 | | C638.478 | C639.478 |
| | C320.479 | C321.479 | C322.479 | | C638.479 | C639.479 |

| UPPER 8BITS | | | | | | | |
|---|---|---|---|---|---|---|---|
| [0] | Y0.0 | Y2.0 | | Y636.0 | Y638.0 | C0.0 | C1.0 | | C316.0 | C317.0 |
| [1] | Y0.1 | Y2.1 | | Y636.1 | Y638.1 | C320.0 | C321.0 | | C636.0 | C637.0 |
| [2] | Y0.2 | Y2.2 | | Y636.2 | Y638.2 | C0.2 | C1.2 | | C316.2 | C317.2 |
| ... | | | | | | | | | | |
| | Y0.478 | Y2.478 | | Y636.478 | Y638.478 | C0.478 | C1.478 | | C316.478 | C317.478 |
| [479] | Y0.479 | Y2.479 | | Y636.479 | Y638.479 | C320.478 | C321.478 | | C636.478 | C637.478 |

22b

| LOWER 8BITS | | | | | | | |
|---|---|---|---|---|---|---|---|
| [0] | Y1.0 | Y3.0 | | Y637.0 | Y639.0 | C2.0 | C3.0 | | C318.0 | C319.0 |
| [1] | Y1.0 | Y3.1 | | Y637.1 | Y639.1 | C322.0 | C323.0 | | C638.0 | C639.0 |
| [2] | Y1.2 | Y3.2 | | Y637.2 | Y639.2 | C2.2 | C3.2 | | C318.2 | C319.2 |
| ... | | | | | | | | | | |
| | Y1.478 | Y3.478 | | Y637.478 | Y639.478 | C2.478 | C3.478 | | C318.478 | C319.478 |
| [479] | Y1.479 | Y3.479 | | Y637.479 | Y639.479 | C322.478 | C323.478 | | C638.478 | C639.478 |

PICTURE STORAGE DEVICE SEPARATES LUMINANCE SIGNAL INTO EVEN NUMBER AND ODD NUMBER DATA AND SEPARATES TWO CHANNEL COLOR SIGNAL INTO FORMER HALF PIXELS AND LATTER HALF PIXELS

This is a division of application Ser. No. 08/568,646 filed Dec. 7, 1995, U.S. Pat. No. 5,654,773.

BACKGROUND OF THE INVENTION

This invention relates to a picture storage device for storing input color picture data used or color picture data in picture processing, such as a picture storage device conveniently employed in conjunction with an electronic still camera or a video camera.

In general, dynamic RAMs or static RAMs are employed most frequently as picture memories. By employing these semiconductor memories as picture memories, data transfer with the picture input/output devices or picture processing devices may be carried out at a high transfer rate.

However, since the DRAM or SRAM has only one input/output port, it is necessary to switch between the accessing to a picture processing device and that to an output device such as a display if it is desirable to carry out picture processing and picture display simultaneously. The result is a complicated construction of the peripheral circuit of the picture memory and a poor processing efficiency.

For overcoming this problem, a dual-port memory for video has been developed and commercialized. This dual port memory for video is a DRAM to which are annexed two ports, namely a random access port and a serial access port. By employing the dual-port memory for video, picture data may be outputted to the display via the serial access port, at the same time as picture data being processed may be inputted to or outputted from the picture processing device via the random access port.

Figure 1:
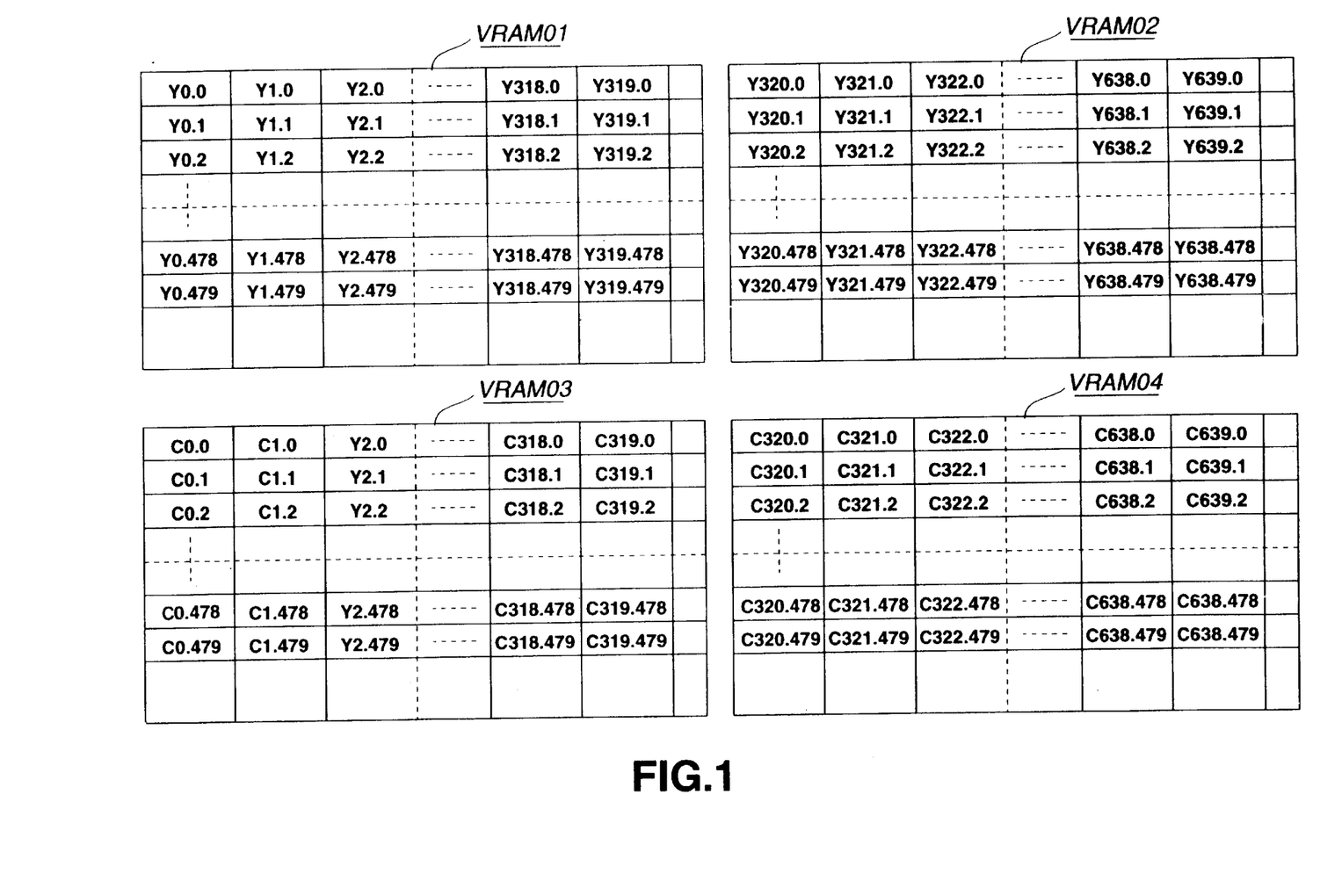
FIG. 1 shows a memory format with picture data being recorded in a conventional picture memory.

As a picture storage device for storing color picture data, having a data format such that the resolution is 640×480 dots, the number of pixel data of the luminance signal Y and two-channel color signals U/V being eight and the sampling rate of the luminance signals and the two-channel color signals being 4 for luminance signals, Y: 2 for the color signal and U: 2 for the color signal V, four dual-port memories for video VRAM 01 to VRAM 04, each having a storage capacity of 2 Mbits (megabits), as shown in FIG. 1, are employed.

Pixel data Y0.0 to Y319.479 for luminance signals Y are stored in VRAM 01, while pixel data Y320.0 to Y639.479 for luminance signals Y are stored in VRAM 02. On the other hand, two-channel color signals U/V, that is pixel data C0.0 to C319.479 of chroma signals C, are stored in VRAM 03, while two-channel color signals U/V, that is, pixel data C320.0 to C639.479 of chroma signals C, are stored in VRAM 04.

The luminance pixel data Y0.0 to Y639.479 and the chroma pixel data C0.0 to C639.479, recorded in VRAM 01 to VRAM 04, are each made up of 8 bits. On the other hand, VRAM 01 and VRAM 03 or VRAM 02 and VRAM 04 may be accessed simultaneously such that read/write may be carried out in terms of 16 bits as a unit.

If the input color picture data is the non-interlaced data with the vertical frequency of 30 Hz, horizontal frequency of 15.75 kHz and clocks of 14.3 MHz, the input color picture data are transiently stored in a buffer so as to be then written in VRAM 01 to VRAM 04, using a high-speed page mode of the VRAM as shown in FIG. 1. When reading out data written from VRAM 01 to VRAM 04, the data written in VRAM 01 to VRAM 04 may be obtained by sequentially outputting the data from VRAM 01 to VRAM 04.

However, since four expensive VRAMs are required with the conventional picture storage devices, it has not been feasible to lower the production cost.

On the other hand, if VRAM 01 and VRAM 04 are accessed simultaneously, 16-bit data Y0.0/C320.0, made up of 8-bit luminance pixel data Y0.0 and 8-bit luminance pixel data C320.0 are read out. The pixel data of the luminance signals Y and the chroma signals C are each 8 bits, while a data bus transferring the data is of 16-bit width, high-speed data transfer cannot be achieved if the luminance signal Y and the chroma signal C are to be transferred independently.

OBJECTS AND SUMMARY OF THE INVENTION

It is therefore an object of the present invention to provide a picture storage device which may be manufactured inexpensively.

It is another object of the present invention to provide a picture storage device by which data transfer may be achieved at a high transfer rate.

According to the present invention, there is provided a picture storage device including input data converting means for separating luminance signals of input color picture data having a non-interlaced data format with the sampling rate of the luminance signals and two-route color signals of 4:2:0 into a data string of even-numbered pixels and a data string of odd-numbered pixels, separating the two-route color signals of the color picture data into a data string of the former half pixels and a data string of the latter half pixels, and distributing and re-arraying the separated data, storage means having a storage capacity of at least one frame and adapted for storing data in a data re-arraying sequence by the input converting means, display data converting means for converting the data stored in the storage means into picture-displaying data, and control means for controlling the input converting means into synchronization with data writing in the storage means.

The storage means is a dual-port memory, and the controller controls the input data converting means and the display data converting means so that data writing in the storage means and data readout from the storage means will be carried out simultaneously.

The storage means is a synchronous dynamic random access memory and the control means controls the input data converting means and the display data converting means so that data writing in the storage means and data readout therefrom will be alternately carried out on the clock basis.

The picture storage device also includes data format converting means for converting input color picture data into a non-interlaced data format with the sampling rate of 4:2:0. The data format converting means transmits color picture data converted into a data format with a sampling rate of 4:2:0 to the input data converting means.

The storage means is comprised of plural memory means each having a storage capacity of at least one frame. The control means selects memory means in which to write data or from which to read out data and manages control for writing data in the selected memory means or reading out data therefrom.

With the present picture storage device, the input data converting means separates luminance signals of input color picture data having a non-interlaced data format with the sampling rate of the luminance signals and two-route color signals of 4:2:0 into a data string of even-numbered pixels and a data string of odd-numbered pixels, separates the two-route color signals of the color picture data into a data string of the former half pixels and a data string of the latter half pixels, and distributes and re-arrays the separated data. The storage means has a storage capacity of at least one frame and stores data in a data re-arraying sequence by the input converting means. The display data converting means converts the data stored in the storage means into picture-displaying data. The control means controls the input converting means into synchronization with data writing in the storage means. The recording means records on a row of two-route color signals for two rows of luminance signals in the sequence in which the signals have been converted by the input data converting means. This reduces the capacity required of the recording means and hence its cost. If the luminance signals and the two-route color signals are accessed separately, since the luminance signals and the two-route color signals can be accessed on the basis of data units read out from the recording means, data can be transferred expeditiously.

With the picture storage device of the present invention, the storage means is a dual-port memory. The control means controls the input data converting means and the display data converting means so that data writing in the storage means and data readout from the storage means will be carried out simultaneously. This further increases the data transfer rate.

With the picture storage device of the present invention, the storage means is a synchronous dynamic random access memory, and the control means controls the input data converting means and the display data converting means so that data writing in said storage means and data readout therefrom will be alternately carried out on the clock basis. This leads to a still higher transfer rate of the picture data.

The picture storage device also includes data format converting means for converting input color picture data into a non-interlaced data format with the sampling rate of 4:2:0. The data format converting means transmits color picture data converted into a data format with a sampling rate of 4:2:0 to the input data converting means. This reduces the cost of recording means without regard to the data format of the input color picture data to enable data transfer at a higher transfer rate.

The storage means is comprised of plural memory means each having a storage capacity of at least one frame. The control means selects memory means in which to write data or from which to read out data and manages control for writing data in the selected memory means or reading out data therefrom. This enables cost reduction of the recording means and data transfer at a higher transfer rate even in case of handling plural pictures.

DESCRIPTION OF THE PREFERRED EMBODIMENTS

Referring to the drawings, preferred embodiments of the present invention will be explained in detail.

Figure 2:
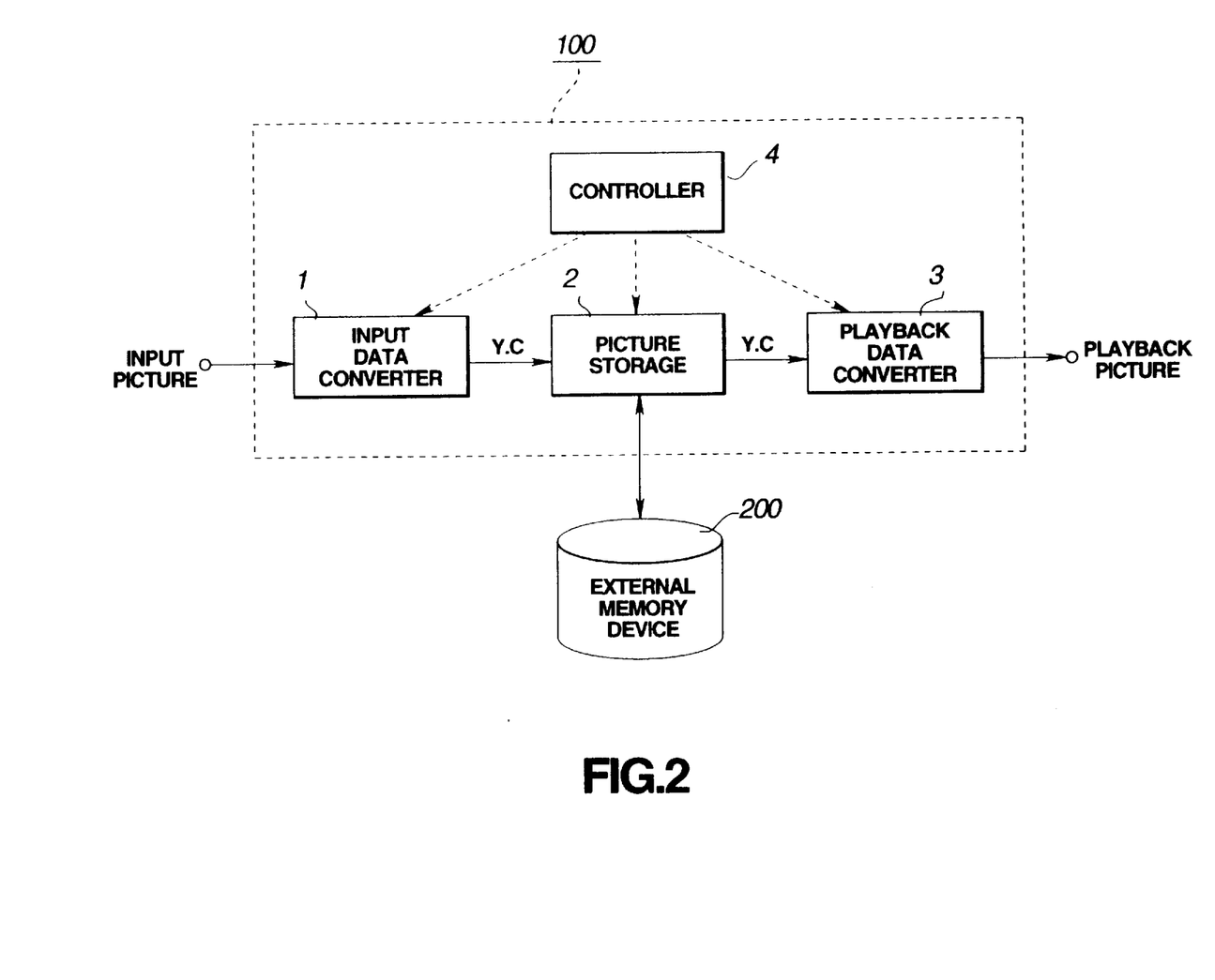
FIG. 2 is a block diagram showing the construction of a picture storage device according to a first embodiment of the present invention.

To a picture storage device 100 are connected an external storage device 200 and a display device, not shown, as shown in FIG. 2.

The picture storage device 100 has an input data converting unit 1 for converting the input color picture data, referred to herein simply as picture data, a picture storage unit 2 for storing the picture data converted into data of pre-set data format and a playback data converting unit 3 for converting the picture data stored in the picture storage unit 2 into playback data to be displayed on a display device.

The input data converting unit 1 separates picture data inputted to the picture storage device 100, for example, picture data with the vertical synchronization frequency of 30 Hz, horizontal synchronization frequency of 15.75 kHz, data clocks of 14.30 MHz and the effective pixel size of 640×480 dots, into luminance signals Y and two sorts of color signals U and V, while converting the signals into non-interlaced data with the sampling rate of 4:2:0.

The luminance signals Y and the two sorts of color signals U, V thus converted are data strings of pixels each composed of 8 bits. These data strings enter the picture storage unit 2 n input sequences of Y0, Y1, Y2, Y3, Y4, . . . for the luminance pixel data and U0, V1, U2, V3, U4, . . . for the two sorts of the color picture data.

These two sorts of the color signals U and V are denoted by chroma signals C, such that U0=C0, V1=C1, U2=C2, V3=C3 and so forth. Thus the two sorts of the color pixel data U0, V1, U2, V3, U4 and so forth may be represented by C0, C1, C2, C3, C4 and so forth.

Figure 4:
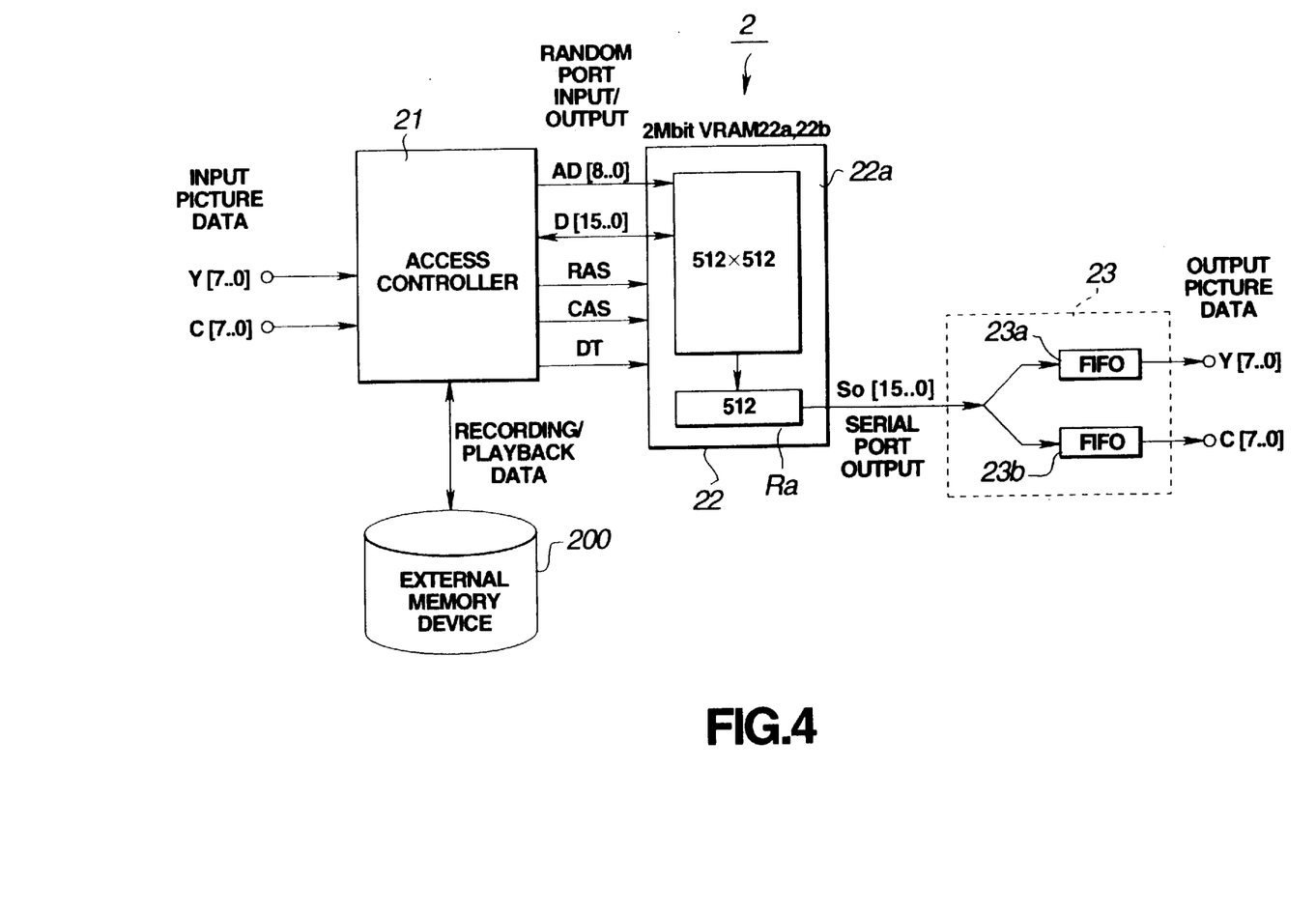
FIG. 4 is a block diagram showing the construction of a picture storage unit of the picture storage device.

The picture storage unit 2 has an access controller 21, a picture memory 22, made up of two 2-Mbit dual port memories for video, and a data output unit 23, as shown in FIG. 4. The access controller 21 re-arrays the luminance pixel data Y0, Y1, Y2, Y3, Y4 and so forth and the chroma pixel data C0, C1, C2, C3, C4 and so forth from the input data converting unit 1 in a sequence for writing in the picture memory 22 and controls the input/output of a random access port of the picture memory 22. The data output unit 23 converts 16-bit data [15 . . . 0] outputted from the serial access port for video of the picture memory 22 into 8-bit luminance pixel data Y[7 . . . 0] and 8-bit chroma pixel data C[7 . . . 0] and outputs the converted data.

Figure 5:
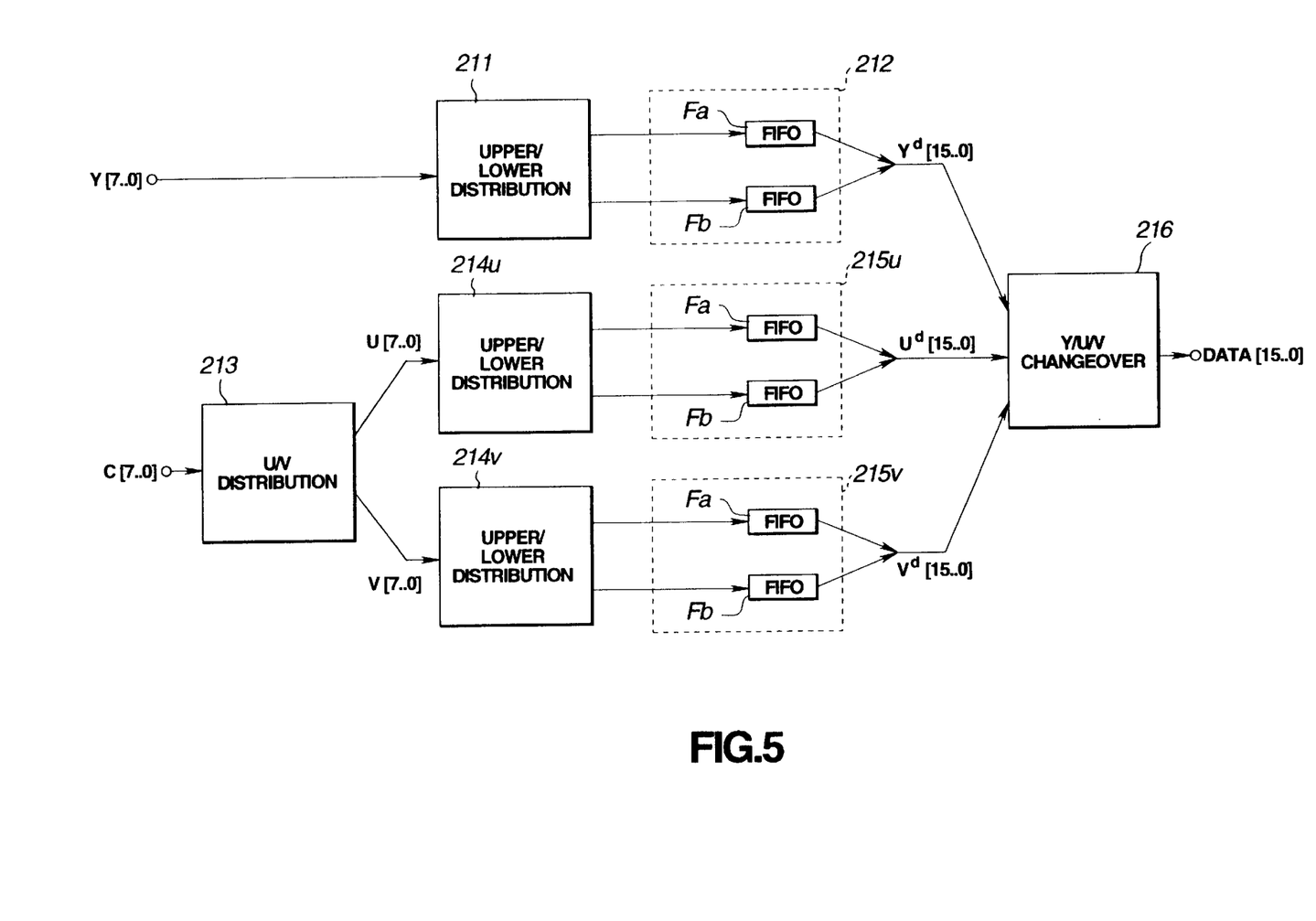
FIG. 5 is a block diagram showing a portion of the construction of an access controller of the picture storage unit of FIG. 4.

The access controller 21 has a data re-arraying processor shown in FIG. 5. The data re-arraying processor has a bit distributing unit 211 for distributing luminance pixel data Y[7 . . . ] from the input data converting unit 1 shown in FIG. 2 into upper-order bits or lower-order bits, and a data generating unit 212 for generating 16-bit luminance data $Y^d[15 \ldots 0]$ from the luminance pixel data Y[7 . . . 0] distributed to the upper-order bits or the lower-order bits. The data re-arraying processor also includes a color signal distributing unit 213 for distributing the chroma pixel data C[7 . . . 0] from the input data converting unit 1 into color pixel data U[7 . . . 0] and color pixel data V[7 . . . 0], and a bit distributing unit 214u for distributing the color pixel data U[7 . . . 0] into upper-order bits and lower-order bits. The data re-arraying processor also includes a data generating unit 215a for generating 16-bit color data $U^d[15 \ldots 0]$ from the color pixel data distributed to the upper-order bits or the lower-order bits, and a bit distributing unit 214v for distributing the color pixel data V[7 . . . 0] into upper-order bits or lower-order bits. The data re-arraying processor also includes a data generator 215v for generating 16-bit color data $V^d[15 \ldots 0]$ from the color pixel data V[7 . . . 0] distributed to the upper-order bits or lower-order bits, and a changeover unit 216 for switching between the luminance data $Y^d[15 \ldots 0]$, color data $U^d[15 \ldots 0]$ and color data $V^d[15 \ldots 0]$ for outputting selected data as converted data Data[15 . . . 0].

The data generating unit 212, data generating unit 215u and the data generating unit 215v are each provided with FIFOs (first-in first-out memories) Fa and Fb. The pixel data of the lower-order bits are supplied to the FIFO register Fa, while the pixel data of the upper-order bits are supplied to the FIFO register Fb. These FIFO registers Fa, Fb synthesize the 8-bit pixel data to generate 16-bit data.

Figure 3:
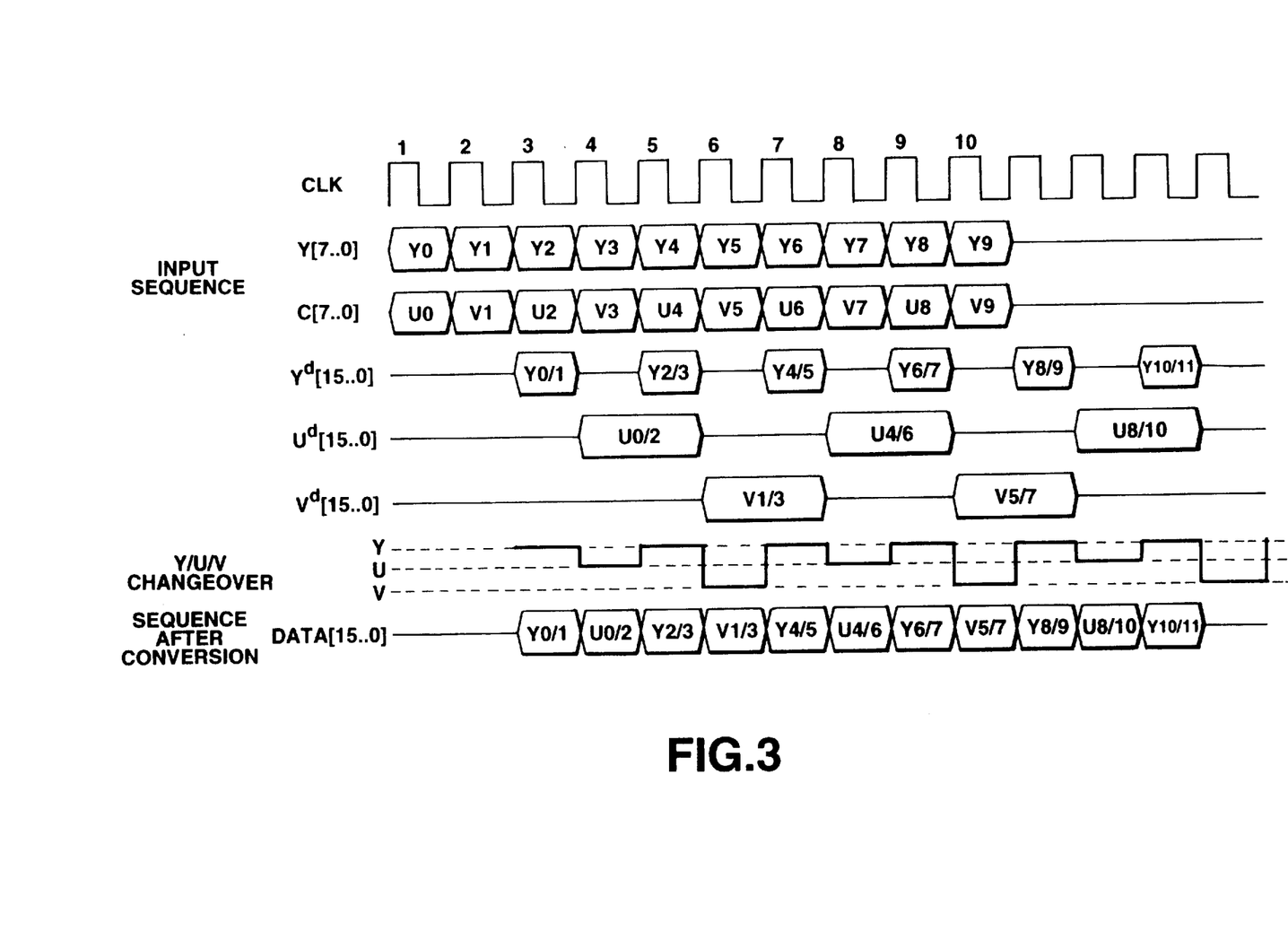
FIG. 3 is a timing chart for illustrating the data conversion timing for luminance and chroma signals of the input color picture data.

Referring to FIG. 3, the operation of the data re-arraying processor of the access controller 21 is explained in detail.

The bit distributing unit 211 distributes even-numbered pixel data Y0, Y2, Y4, . . . and odd-numbered pixel data Y1, Y3, Y5, . . . among the luminance pixel data Y[7 . . . 0] (Y0, Y1, Y2, Y3, Y4, . . . ) from the input data converting unit 1 into upper-order bits and lower-order bits, respectively. The bit distributing unit supplies the even-numbered pixel data Y0, Y2, Y4, . . . to the FIFO register Fa of the data generating unit 212, while supplying the odd-numbered pixel data Y1, Y3, Y5, . . . to the FIFO register Fb of the data generating unit 212.

The data generating unit 212 synthesizes e.g., the luminance pixel data Y0 and the luminance pixel data Y1 by the FIFO registers Fa, Fb for generating 16-bit luminance data $Y^d[15 \ldots 0]$ (Y0/1). The data generating unit synthesizes the remaining data in a similar manner for generating 16-bit luminance data $Y^d[15 \ldots 0]$ (Y2/3, Y4/5, Y6/7 . . . ). The luminance data $Y^d[15 \ldots 0]$ is supplied to the changeover unit 216.

The color signal distributing unit 213 distributes chroma pixel data C[7 . . . 0] (=C0, C1, C2, C3, C4, . . . ) from the input data converter 1, that is the two-route color pixel data U, V [7 . . . 0] (=U0, V1, U2, V3, U4, . . . ) to color pixel data U [7 . . . 0] and to color pixel data V [7 . . . 0]. For example, the chroma pixel data C0 is supplied as the color pixel data U0 to the bit distributing unit 214u, while the next chroma pixel data C1 is supplied as the color pixel data V1 to the bit distributing unit 214v.

Thus the bit distributing unit 214u is supplied with the color pixel data U0, U2, U4, U6 and so forth, while the bit distributing unit 214v is supplied with the color pixel data V1, V3, V5, V7 and so forth.

The bit distributing unit 214u distributes color pixel data U[7 . . . 0] (=U0, U2, U4, U6, . . . ) to upper-order bits and lower-order bits. For example, the color pixel data U0 are supplied as upper-order bits to the FIFO register Fa of the data generating unit 215u, while the color pixel data U2 are supplied as lower-order bits to the FIFO register Fb of the data generating unit 215u. The color pixel data are sequentially distributed in this manner to upper-order and lower-order bits.

The data generating unit 215u synthesizes the color pixel data U0 and the color pixel data U2 by the FIFO registers Fa, Fb for generating 16-bit color data $U^d[15 \ldots 0]$ (=U0/2). The succeeding data are similarly synthesized for generating 16-bit color data $U^d[15 \ldots 0]$ (=U0/2, U4/6, U8/10, . . . ). These color data $U^d[15 \ldots 0]$ are fed to the changeover unit 216.

The bit distributing unit 214v distributes color pixel data U[7 . . . 0] (=V1, V3, V5, V7, . . . ) to upper-order bits and lower-order bits. For example, the color pixel data V1 are supplied as upper-order bits to the FIFO register Fa of the data generating unit 215v, while the color pixel data V3 are supplied as lower-order bits to the FIFO register Fb of the data generating unit 215v. The color pixel data are sequentially distributed in this manner to upper-order and lower-order bits.

The data generating unit 215v synthesizes the color pixel data V1 and the color pixel data V3 by the FIFO registers Fa, Fb for generating 16-bit color data $V^d[15 \ldots 0]$ (=V1/3). The succeeding data are similarly synthesized for generating 16-bit color data $V^d[15\ 0]$ (=V1/3, V5/7, . . . ). These color data $V^d[15 \ldots 0]$ are supplied to the changeover unit 26.

The changeover unit 216 outputs the luminance data $Y^d[15 \ldots 0]$ from the data generating unit 212, color data $U^d[15 \ldots 0]$ from the data generating unit 215u and the color data $V^d[15 \ldots 0]$ from the data generating unit 215v as shown in FIG. 2 and outputs the selected data as converted data Data[15 . . . 0]. The converted data Data[15 . . . 0] has its output sequence switched in the sequence of Y0/1, U0/2, Y2/3, V1/3, Y4/5 and so forth.

As described above, the access controller 21 re-arrays the luminance data Y[15 . . . 0] and the chroma pixel data C[7 . . . 0] from the input data converter 1 to generate converted data Data[15 . . . 0] (=Y0/1, C0/2, Y2/3, C1/3, Y4/5 and so forth. The access controller 21 accesses the picture memory 22 and sequentially writes the converted data therein. The access controlling to the picture memory 22 is explained subsequently.

Figure 6:
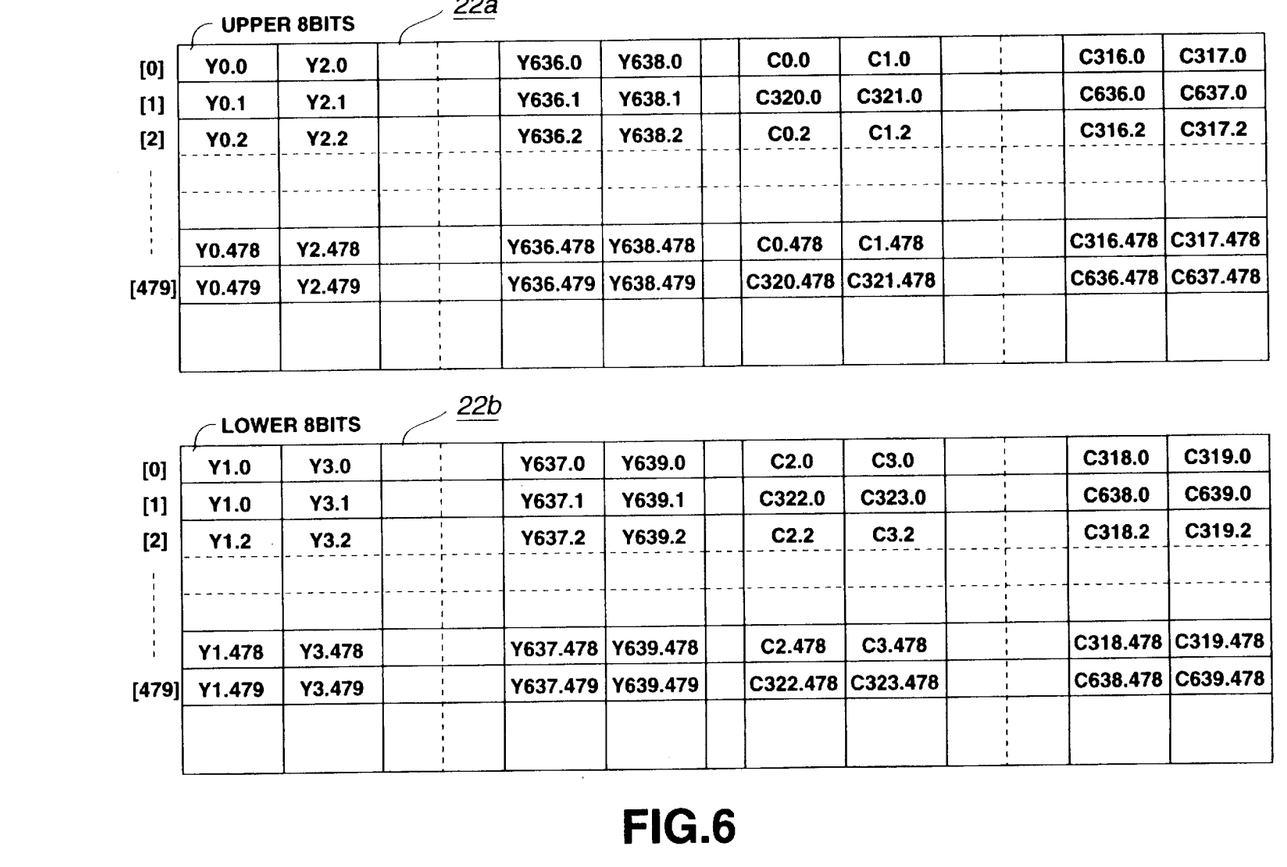
FIG. 6 shows a memory format of a picture memory of the picture storage unit of FIG. 4, having picture data stored therein.

The picture memory 22 is made up of dual-port memories for video 22a, 22b each having the capacity of 2 Mbits (512×512×8 bits) as shown in FIG. 6. The dual-port memory for video is referred to herein as a VRAM.

More specifically, the VRAM is a conventional dynamic random-access memory (DRAM) to which is annexed a serial access port for video.

With the dual-port memory, there is annexed a provision for timing as to the decay of a row address strobe input (RAS) in the write enable input (WE) and the output enable input (OE), while there are also newly annexed a write per bit control input (WB) and a data transfer control input (DT). The newly annexed WB and DT are signals at the time of decay of RAS, while WE and OE are signals names for the decay of the column address strobe input (CAS).

There are four combinations of WB/WE and DT/OE at the time of decay of RAS. By these combinations, the same modes as those of the conventional DRAM, that is, the write per bit mode, read transfer cycle mode and the write transfer cycle mode etc., are selected.

The write per unit mode means such a mode in which only particular bits can be written by affording a mask pattern called a write per bit. The read transfer cycle mode is such a mode in which 512×8 bit data in a memory array in a dual port is transferred at a time to a register for serial transfer. The write transfer mode is such a mode which is the reverse of the read transfer cycle, that is a mode in which 512×8 bit data serially entered and stored in a register are transferred at a time to a memory array.

FIG. 4 shows a portion associated to one port of the dual-port memory, such as VRAM 22*a*. When the RAS rises during the read transfer cycle mode, that is when the read transfer cycle is started, the address AD, supplied simultaneously to the address terminal, selects a sole 512-dot row from within the memory array as a row address. The selected row address is transferred at a time to the register Ra.

The column address, given simultaneously with the decay of CAS, is set in a binary counter, which is incremented each time the serial control clock input (SC) rises, so that the column address transferred to the register Ra is sequentially outputted to a serial port So.

That is, with the sole VRAM 22*a*, 512-dot pixel data can be read out during one read transfer cycle at the serial port So. Thus, with the two VRAMs 22*a*, 22*b*, 1024-dot pixel data can be read out during one read transfer cycle at the serial port So. On the other hand, the data written on the VRAMs 22*a*, 22*b* can be simultaneously accessed as 16-bit data if these data are the same address data. The upper 8 bits and the lower 8 bits of the 16-bit data are associated with the two VRAMs 22*a*, 22*b*. The luminance pixel data Y0.0 of the line of the VRAM 22*a* and the luminance pixel data Y1.0 of the line of the VRAM 22*b* may be simultaneously accessed as 16-bit data (=Y0.0/Y1.0), with the luminance pixel data Y0.0 and Y1.0 being the upper 8 bits and the lower 8 bits, respectively.

Data write/readout in or from the picture memory 22, made up of VRAMs 22*a*, 22*b*, is executed by the access controller 21 controlling inputs to RAS, CAS, DT or SC.

When writing the converted data Data [15 . . . 0] obtained by the access controller 21 in the VRAMs 22*a*, 22*b*, 640 luminance pixel data Y0 to Y639 and 320 chroma pixel data C0 to C319, among the converted data Data [15 . . . 0], are present at the same row address. Thus the access controller 21 accesses the lines represented by a line with high page address so that 640 luminance pixel data Y0 to Y639 and 320 chroma pixel data C0 to C319, totalling 960 data, will be written in the VRAMs 22*a*, 22*b*, respectively.

Thus, even-numbered pixel data Y0.0, Y2.0, . . . , Y638.0 of the luminance pixel data Y[7 . . . 0] and the former half pixel data C0.0, C1.1, . . . , C317.0 of the chroma pixel data C[7 . . . 0] are written in a line having the address [0] of the VRAM 22*a*, as shown in FIG. 5. On the other hand, odd-numbered pixel data Y1.0, Y3.0, . . . , Y639.0 of the luminance pixel data Y[7 . . . 0], and the latter half pixel data C2.0, C3.1, . . . , C319.0 of the chroma pixel data C[7 . . . 0] are written in a line having the address [0] of the VRAM 22*b*.

It is noted that the 320 chroma data C320 to C639 are written at the same address [1] when writing the 640 luminance pixel data Y0 to Y629 of the next line in the line represented by the address [1].

That is, two rows of luminance signals Y are written during the time one line of the chroma signals are written. However, since the data format is 4:2:0, it suffices to write one line of chroma signals for two lines of luminance signals Y. That is, 640×480 dot pixel data in their entirety can be written in the VRAMs 22*a*, 22*b*.

Figure 7:
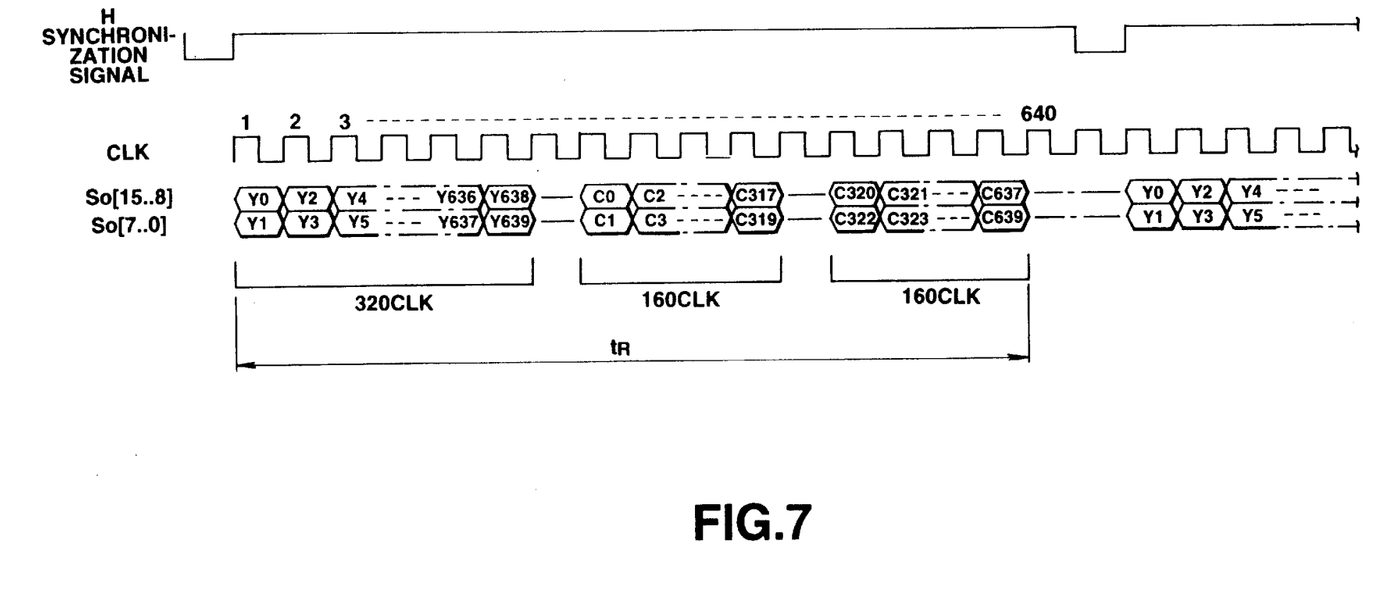
FIG. 7 is a timing chart showing the timing of data read out from a serial port of the picture memory.

On the other hand, for reading out data from the VRAMs 22*a*, 22*b*, the access controller 21 manages control so that the 640 luminance pixel data Y0 to Y639 written in the first lines of the VRAMs 22*a*, 22*b* and the 640 chroma pixel data C0 to C639 written in the first and second lines of the VRAMs 22*a*, 22*b* will be read out during a 640-clock time interval $T_R$, as shown in FIG. 7.

Thus, data S0 [15 . . . 0] (=Y0/Y1, Y2/Y3, . . . Y638/Y639, C0/C2, C1/C3, . . . , C317/C319, C320/C322, C321/C323, . . . , C637/C639), each made up of 16 bits, are sequentially output from the serial port to a data output unit 23.

Of the 16-bit data So [15 . . . 0], read out from the VRAMs 22*a*, 22*b*, C0/C2, for example, stands for the color pixel data U0 and color pixel data U2, whereas C1/C3 stands for color pixel data V1 and color pixel data V3, respectively. Thus, when transferring the luminance signal Y, color signal U and the color signal V separately to the external storage device 200, accessing may be had on the 16-bit basis, thus enabling data transfer to be achieved at a high transfer rate.

The data operating unit 23 has FIFO registers 23*a*, 23*b* where the data So [15 . . . 0], supplied via the serial port, is converted into data for display entering the picture storage unit 2. That is, the data output unit 23 converts the luminance pixel data Y [7 . . . 0] entering the picture storage unit 1 so that these data Y[7 . . . 0] will be in the same sequence, and outputs the converted data.

Figure 8:
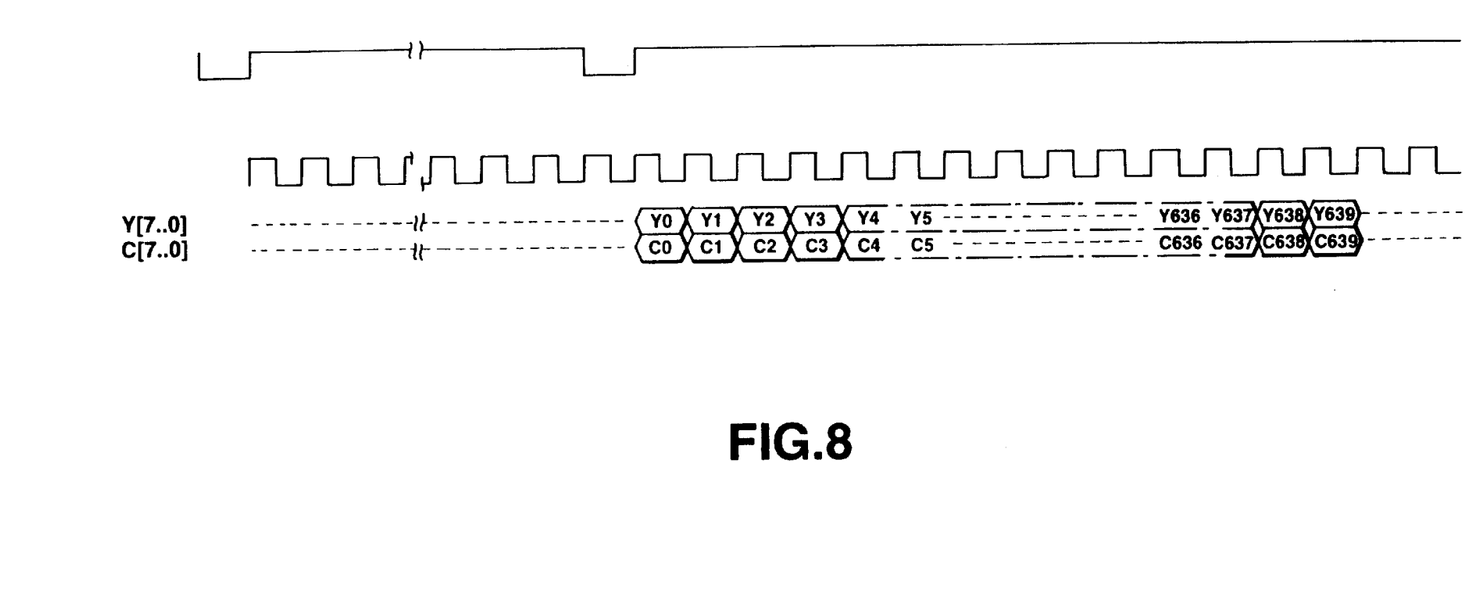
FIG. 8 is a timing chart showing the timing of output data from the picture storage unit of FIG. 4.

Of the data S0[15 . . . 0], luminance data $Y^d$ [15 . . . 0] and chroma data $C^d$[15 . . . 0], for example, are supplied to the FIFO registers 23*a*, 23*b*, respectively. The FIFO register 23*a* sequentially outputs the luminance pixel data Y [7 . . . 0] (=Y0, Y1, Y2, Y3, . . . ), each composed of 8 bits, to the playback data converter 3 of FIG. 2, as shown in FIG. 8. On the other hand, the FIFO register 23*b* sequentially outputs the chroma pixel data Y [7 . . . 0] (=C0, C1, C2, C3, . . . ), each composed of 8 bits, to the playback data converter 3 of FIG. 2.

Based upon the luminance pixel data Y[7 . . . 0] and the chroma pixel data C[7 . . . 0] from the data output unit 23, the playback data converter 3 generates playback data for displaying a picture on a display device, not shown. Thus the display device displays a picture derived from the playback data generated by the playback data converting unit 3.

The write/readout in or from the picture memory 22 is controlled by the controller 4 so as to occur simultaneously.

Figure 9:
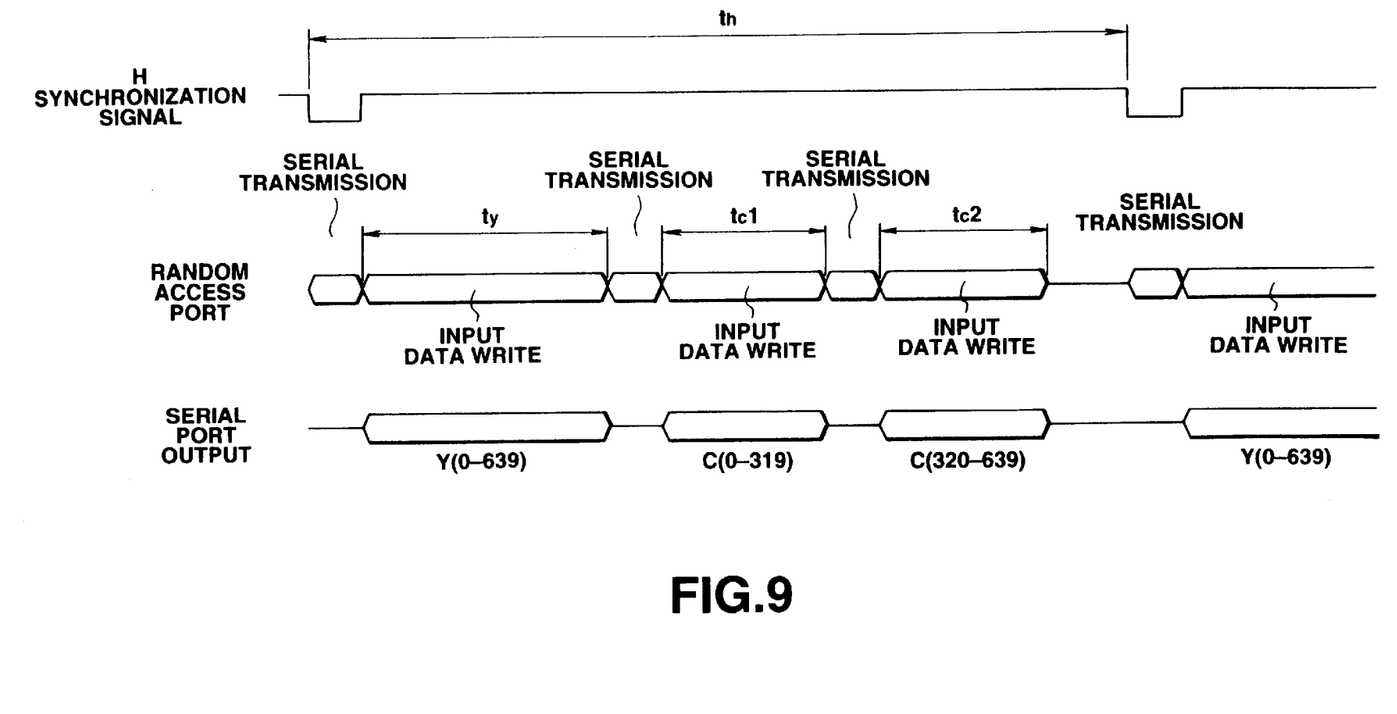
FIG. 9 is a timing chart showing the recording timing and readout timing in or from the picture memory.

Specifically, this control is made so that the following operation occurs during one horizontal synchronization period th. That is, during the period ty when 640 luminance pixel data Y[7 . . . 0] is serially transmitted via a random access port to the picture memory 22 so as to be written in the VRAMs 22*a*, 22*b*, the luminance pixel data Y [7 . . . 0] thus written in the VRAMs 22*a*, 22*b* will be outputted via the serial access port. On the other hand, during the period tc1 when the former half pixel data C0 to C319 of the former half of the chroma pixel data C [7 . . . 0] are serially transmitted via the random access port to the picture memory 22 so as to be written in the VRAMs 22*a*, 22*b*, the former half pixel data C0 to C319 of the former half of the chroma pixel data C [7 . . . 0] recorded in the VRAMs 22*a*, 22*b* are output via the serial access port. Similarly, during the period tc2 when the latter half pixel data C320 to C639 of the latter half of the chroma pixel data C [7 . . . 0] are serially transmitted via the random access port to the picture memory 22 so as to be written in the VRAMs 22*a*, 22*b*, the latter half pixel data C320 to C639 of the latter half of the chroma pixel data C [7 . . . 0] recorded in the VRAMs 22*a*, 22*b* are output via the serial access port.

The operation of the above-described picture storage device 100 is explained by referring to FIGS. 2 and 4.

The input data converter 1 separates the input picture data into luminance signals Y and 2-route color signals U, V (=chroma signal C) and converts the separated luminance signals Y and the 2-route color signals U, V (=chroma signals) into a non-interlaced data format having a sampling rate of 4:2:0. The separated luminance signals Y and the 2-route color signals U, V (=chroma signals) are supplied to the access controller 21.

The access controller 21 separates the luminance signals Y obtained by the input data converter 1 into a data string of even-numbered pixels and a data string of odd-numbered pixels. From these data strings, the access controller 21 generates 16-bit luminance data $Y^d$ of which odd-numbered pixel data constitute upper-order bits and even-numbered pixel data constitute lower-order bits. On the other hand, the access controller 21 separates the chroma signals C obtained by the input data converting unit 1 into two-route color signals U and V, while separating the two-route color signals U and V into a data string of former half pixels and a data string of latter half pixels. The access controller switches between the color data $Y^d$ [15 . . . 0], color data $U^d$ [15 . . . 0] and color data $V^d$ [15 . . . 0], thus generated, and outputs the selected data for generating converted data data[15 . . . 0]. The access controller also controls data entry to the picture memory 22, such as RAS, CAS, DT or SC, so that the converted data Data [15 . . . 0] will be sequentially written in the VRAMs 22a, 22b.

The access controller 21 also controls data entry to the picture memory 22, such as RAS, CAS, DT or SC, so that the converted data Data [15 . . . 0] written in the VRAMs 22a, 22b will be sequentially read out from the serial access port.

The controller 4 controls the access controller 21 at this time so that data writing and data readout in or from the picture memory 22 will be performed simultaneously.

The converted 16-bit data Data [15 . . . 0], read out from the serial access port, that is data So [15.00], is supplied to the data output unit 23.

The data output unit 23 converts the data S0 [15 . . . 0], supplied thereto via the serial access port, so that the luminance signals Y and the chroma signals C entering the picture storage unit 2 will be in the same sequence, and transmits the converted data So [15 . . . 0] to the playback data converter 3.

The data converter 3 generates playback data for picture display based upon the chroma signals and the luminance signals Y obtained at the data output unit 23 and transmits the generated playback data to a display device, not shown.

The display device displays a picture derived from the playback data from the playback data converter 3.

If the luminance signals Y, color signals U and the color signals V are separately transferred to the external storage device 200, the access controller 21 distributes the converted data Data [15 . . . 0] read out from the VRAMs 22a, 22b into luminance signals $Y^d$ [15 . . . 0], color signals $U^d$ [15 . . . 0] or color signals $V^d$ [15 . . . 0] and separately transfers these signals to the external storage device 200.

In the present embodiment, since the input picture data is converted into data for writing in the picture memory 22, and the picture memory 22 is made up of two 2-Mbit dual port memories for video, the memory may be reduced in cost.

For separately transferring the luminance signals Y, color signals U and the color signals V from the picture storage device to the external storage device 200, data accessing may be executed in terms of 16 bits as a unit and hence data may be transferred at a higher transfer rate.

The second embodiment of the picture storage device according to the present invention is now explained.

In the above-described first embodiment, two 2-Mbit VRAMs are employed as the picture memory 22. In the present second embodiment, a 4-Mbit synchronous RAM is employed as the picture memory 22.

The arrangement of the picture storage device and the input/output sequence are the same as those in the first embodiment and hence are not explained in detail.

With the synchronous dynamic RAM or synchronous DRAM, since data input/output is carried out in synchronism with external clocks, inter-data skew is disregarded. On the other hand, data recording and data readout are carried out so that data on the same row address will be written and read out continuously in terms of 2, 4 and 8 word blocks as units. Data accessing is made by simply designating the starting address of a given block, with the addresses being incremented in the inside of the synchronous DRAM. Such 4-Mbit synchronous DRAM, capable of clock-synchronized accessing, is used as the picture memory 22.

With the synchronous DRAM, since the memory write/readout cannot be executed simultaneously, writing and readout in or from the memory may be carried out alternately on the clock basis. That is, with the synchronous DRAM, writing and readout in or from the memory is carried out at a rate twice as fast as that for the video data. Thus the controller 4 controls the access controller 21 so that the data writing and readout will be carried out simultaneously at a rate twice the clock rate.

Thus, by employing a 4-Mbit synchronous DRAM in place of two 2-Mbit VRAMs, data transfer may be carried out at a still higher rate.

The third embodiment of the picture storage device according to the present invention is now explained.

In the above-described first and second embodiments, two 2-Mbit VRAMs and a 4-Mbit synchronous DRAM are employed as the picture memory 22, respectively. Within the present embodiment, plural 2-Mbit VRAMs are employed as the picture memory 22.

In the present embodiment, the parts or components which are the same as those of the previous embodiment are depicted by the same numerals, and the corresponding description is not made for simplicity.

Figure 10:
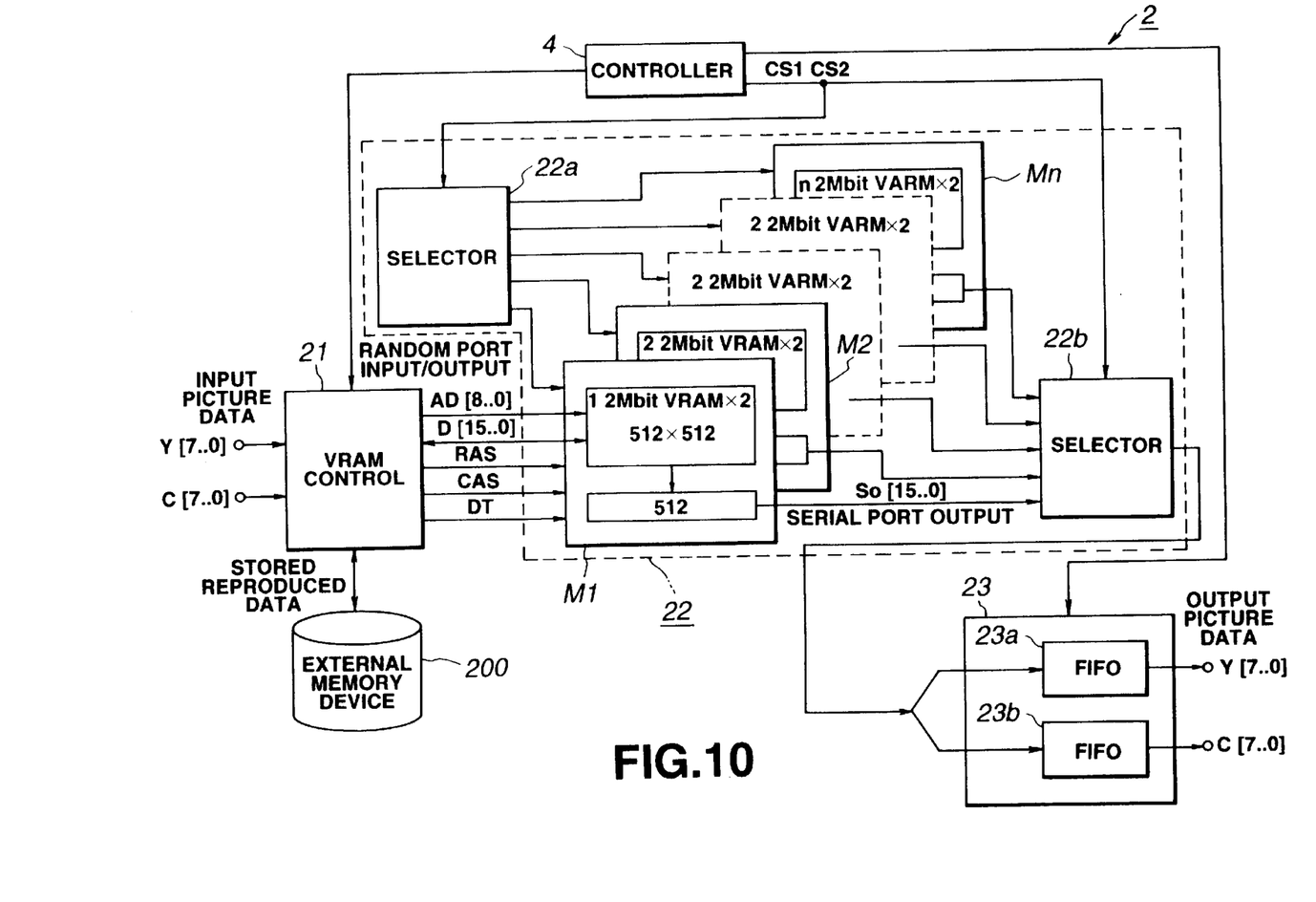
FIG. 10 is a block diagram showing the construction of a picture storage device according to a second embodiment of the present invention.

The picture memory 22 has n memories M1 to Mn, each of which is comprised of two 2-Mbit VRAMs, a selector 220a for selecting data to be recorded on the n memories M1 to Mn, and a selector 220b for selecting a memory from which to read data from among the n memories M1 to Mn, as shown in FIG. 10. In the present embodiment, the controller 4 shown in FIG. 1 controls memory selection by the selectors 220a, 220b.

Each of the memories M1 to Mn is made up of the two 2-Mbit VRAMs 22a, 22b, as shown in FIG. 6, and stores n input picture data (picture data for n pictures).

The controller 4 transmits to the selector 220a a chip select signal C1 for selecting a memory in which to record data from among n memories M1 to Mn.

The selector 220a selects a memory Mx specified by the chip select signal C1 from the controller 4 from among the n memories M1 to Mn.

For reading out data written in the memories M1 to Mn, a controller 25 transmits to the selector 220*b* a chip select signal C2 for selecting a memory from which to read out data from among the n memories M1 to Mn.

The selector 220*b* selects, from among the n memories M1 to Mn, a memory My specified by the chip select signal C2 from the controller 4. Simultaneously, the controller 4 controls the access controller 21 so that data will be read out from the selected memory My. The selector 220*b* transmits the data read out from the selected memory My to the data output unit 23.

Since the picture memory 22 has plural memories each having a storage capacity of at least one frame, plural pictures can be accessed expeditiously.

It is noted that n 4-Mbit synchronous DRAMs may be employed in place of n memories M1 to Mn each made up of two 2-Mbit VRAMs.

What is claimed is:

1. A picture storage device comprising:

input data converting means for separating luminance signals of input color picture data into a data string of even-numbered pixels and a data string of odd-numbered pixels and for separating the two-channel color signals of the input color picture data into a data string of former half pixels and a data string of latter half pixels, while converting the luminance signals and two-channel color signals into non-interlaced data with a sampling rate of 4:2:0, and for distributing and re-arraying the separated and converted data;

control means;

storage means having a storage capacity of at least one frame and adapted for storing data produced by said input converting means in a data re-arraying sequence and including a plurality of two-port video frame random access memories, a first selector for selecting a memory from among said plurality of memories in which data is to be recorded, and a second selector for selecting a memory from among said plurality of memories from which stored data is to be read out, wherein said first selector and said second selector are controlled by said control means so that data corresponding to a respective plurality of pictures can be provided; and display data converting means for converting the data stored in said storage means and selected by said second selector into picture-displaying data, wherein said control means further controls said input converting means to be in synchronization with data writing in said storage means.

* * * * *